US012790147B2

(12) United States Patent
Leum et al.

(10) Patent No.: US 12,790,147 B2
(45) Date of Patent: Nov. 10, 2026

(54) LOADING DOCK WITH INTEGRATED LEVELER

(71) Applicant: Leum Engineering, Inc., Minnetonka, MN (US)

(72) Inventors: Grant Leum, Excelsior, MN (US); Eric Demerath, Shepherd, MI (US)

(73) Assignee: Leum Engineering, Inc., Hopkins, MN (US)

( * ) Notice: Subject to any disclaimer, the term of this patent is extended or adjusted under 35 U.S.C. 154(b) by 747 days.

(21) Appl. No.: 18/130,649

(22) Filed: Apr. 4, 2023

(65) Prior Publication Data

US 2024/0076146 A1 Mar. 7, 2024

Related U.S. Application Data

(63) Continuation-in-part of application No. 17/902,542, filed on Sep. 2, 2022.

(51) Int. Cl.
*B65G 69/28* (2006.01)

(52) U.S. Cl.
CPC ........ *B65G 69/287* (2013.01); *B65G 69/2811* (2013.01)

(58) Field of Classification Search
CPC .. B65G 69/00; B65G 69/008; B65G 69/2811; B65G 69/276; B65G 69/2876; B65G 69/30
See application file for complete search history.

(56) References Cited

U.S. PATENT DOCUMENTS

| | | | | | |
|---|---|---|---|---|---|
| 3,896,517 | A | 7/1975 | Bigelow, Jr. | | |
| 6,654,976 | B2 * | 12/2003 | Digmann | B65G 69/008 | 52/173.2 |
| 7,409,739 | B2 * | 8/2008 | Whitley | B65G 69/287 | 14/71.3 |

(Continued)

FOREIGN PATENT DOCUMENTS

| | | |
|---|---|---|
| CA | 3182096 | 3/2024 |
| CA | 3182098 | 3/2024 |

(Continued)

OTHER PUBLICATIONS

"U.S. Appl. No. 17/902,542, Non Final Office Action mailed May 28, 2025", 8 pgs.

(Continued)

*Primary Examiner* — Gary S Hartmann
(74) *Attorney, Agent, or Firm* — Schwegman Lundberg & Woessner, P.A.

(57) ABSTRACT

A modular loading dock with a mobile base which includes two, opposing, adjustable leg members and top and bottom surfaces, the top surface having an opening to receive a dock leveler into such opening, the dock leveler includes a lower end and an upper end, the upper end abuts a preexisting structure and the lower end includes a lower edge having a lip, the lip is able to be activated between an extended/engaged position to contact a truck bed and a retracted/disengaged position. The mobile base also includes a housing with a modular frame mounted onto the base in sections and can receive a back end of a vehicle. The modular frame has a tensioned vinyl covering. The modular loading dock can also include an extension portion with a covering.

15 Claims, 10 Drawing Sheets

(56) References Cited

U.S. PATENT DOCUMENTS

| | | | | |
|---|---|---|---|---|
| 8,869,332 | B1 * | 10/2014 | Leum | B65G 69/30 14/69.5 |
| 8,869,334 | B1 * | 10/2014 | Leum | B65G 69/30 14/72.5 |
| 9,051,136 | B2 | 6/2015 | Leum | |
| 9,150,369 | B1 | 10/2015 | Leum | |
| 9,688,493 | B2 | 6/2017 | Leum | |
| 10,479,624 | B2 | 11/2019 | Leum | |
| 11,273,999 | B1 | 3/2022 | Leum et al. | |
| 2020/0317455 | A1 | 10/2020 | Leum et al. | |
| 2020/0347982 | A1 | 11/2020 | Leum et al. | |
| 2022/0073294 | A1 | 3/2022 | Leum et al. | |
| 2024/0076145 | A1 | 3/2024 | Leum et al. | |
| 2024/0076147 | A1 | 3/2024 | Leum et al. | |
| 2024/0336447 | A1 | 10/2024 | Leum et al. | |
| 2025/0042679 | A1 * | 2/2025 | Krolski | B65G 69/30 |
| 2025/0091846 | A1 | 3/2025 | Frame et al. | |

FOREIGN PATENT DOCUMENTS

| | | | |
|---|---|---|---|
| CA | 3210045 | | 3/2024 |
| CA | 3210108 | | 3/2024 |
| CN | 104060857 | A | 9/2014 |
| EP | 2962967 | | 1/2016 |
| EP | 3261964 | B1 | 7/2019 |
| GB | 2561338 | | 10/2018 |
| KR | 20240083752 | | 6/2024 |
| MX | 2022015128 | | 3/2024 |
| MX | 2023010148 | | 3/2024 |
| MX | 2023010150 | | 3/2024 |
| WO | 2016137315 | | 9/2016 |

OTHER PUBLICATIONS

"U.S. Appl. No. 17/902,542, Response filed Sep. 25, 2025 to Non Final Office Action mailed May 28, 2025", 8 pgs.

"Canadian Application Serial No. 3,182,098, Office Action mailed Nov. 6, 2024", 4 pgs.

"Canadian Application Serial No. 3,182,098, Response filed Mar. 5, 2025 to Office Action mailed Nov. 6, 2024", 7 pgs.

"Canadian Application Serial No. 3,210,045, Office Action mailed Feb. 4, 2025", 7 pgs.

"Canadian Application Serial No. 3,210,045, Response filed Jun. 4, 2025 to Office Action mailed Feb. 4, 2025", 14 pgs.

"Canadian Application Serial No. 3,210,108, Office Action mailed Feb. 5, 2025", 9 pgs.

"Canadian Application Serial No. 3,210,108, Response filed Jun. 5, 2025 to Office Action mailed Feb. 5, 2025", 14 pgs.

"Mexican Application Serial No. MX a 2022 015128, Response filed Jan. 7, 2026 to Office Action mailed Sep. 10, 2025", w Machine English Translation, 48 pgs.

"U.S. Appl. No. 17/902,542, Final Office Action mailed Jan. 14, 2026", 6 pgs.

"U.S. Appl. No. 19/193,561, Notice of Allowance mailed Jan. 27, 2026", 7 pgs.

"Canadian Application Serial No. 3,210,108, Examiners Rule 862 Report mailed Feb. 5, 2026", 8 pgs.

"Mexican Application Serial No. MX a 2022 015128, Office Action mailed Sep. 10, 2025", w Machine English translation, 21 pgs.

"Mexican Application Serial No. MX a 2022 015128, Response filed May 14, 2026 to Office Action mailed Feb. 18, 2026", w Machine English Translation, 25 pgs.

"Canadian Application Serial No. 3,210,045, Response filed May 25, 2026 to Examiners Rule 86(2) Requisition mailed Feb. 5, 2026", 14 pgs.

"Canadian Application Serial No. 3,210,108, Response filed May 25, 2026 to Examiners Rule 86(2) Report mailed Feb. 5, 2026", 15 pgs.

* cited by examiner

LOADING DOCK WITH INTEGRATED LEVELER

RELATED APPLICATION

This application is a continuation-in-part claiming the benefit of application Ser. No. 17/902,542, filed on Sep. 2, 2022, the entire contents of which are incorporated herein.

FIELD OF THE INVENTION

This invention relates to an loading dock and more particularly to a loading dock with an extended dock housing with a covering which is modular, easily moveable and able to adjust to the grade.

BACKGROUND OF THE INVENTION

A variety of loading docks with dock housings have been devised which are constructed over docks built into buildings. Loading docks with dock housings protect the dock as well as provide shelter from the weather during loading and unloading of cargo onto trucks and the like.

One such device is seen in EP 3261964 (Fijnvandraat) which discloses a dock leveler with rolling cover. The cover is a light weight aluminum cover. A similar device is disclosed in CN 104060857 which discloses a permanently built dock shelter structure with an adjustment plate and door seal.

Loading docks with dock housings of the prior art have certain shortcomings and disadvantages to which this device is drawn. Specifically, it would be advantageous to have a loading dock with a dock housing which is modular and able to be easily assembled and disassembled without the need for concrete construction. It would also be advantageous to have a loading dock with a dock housing which integrates conventional loading dock levelers. It would also be advantageous to have a loading dock with a dock housing which is mobile so as to allow the loading dock and dock housing to be moved easily from location to location and which can also conform to the grade. Additionally, it would be advantageous to have a loading dock with a covering on the dock housing.

In summary, there are problems and shortcomings in dock housings of the prior art and it is to these needs that this device is drawn.

OBJECTS OF THE INVENTION

It is an object of this invention to provide a loading dock with a dock housing which is modular and able to be easily assembled and disassembled without the need for concrete construction and which can be easily adjustable to conform to the grade.

Another object of this invention is to provide such a loading dock with a dock housing which integrates conventional loading dock levelers.

Yet another object of this invention is to provide a loading dock with a dock housing which is able to be moved easily from one location to another location.

Yet another object of this invention is to provide a loading dock with a dock housing that includes a covering.

These and other objects of the invention will be apparent from the following descriptions and from the drawings.

SUMMARY OF THE INVENTION

In a preferred embodiment of the present invention a modular loading dock includes a mobile base with two, opposing, adjustable leg members and top and bottom surfaces, the top surface having an opening to receive a dock leveler into such opening. The dock leveler includes a lower end and an upper end, the upper end abutting a preexisting structure and the lower end including a lower edge having a lip, the lip being able to be activated between an extended/engaged position to contact a truck bed and a retracted/disengaged position. The modular loading dock also includes a housing with a modular frame mounted onto the base in sections; the sections include a frame-front wall, opposed frame-sidewalls and a frame-top wall. The frame-front wall has a vehicle-receiving opening to receive the back end of a vehicle and the frame includes a covering.

In highly-preferred embodiments the covering is a tensioned vinyl covering and flashing is integral to the tensioned vinyl covering.

Preferably, each adjustable leg member includes at least two adjustable feet which contact and conform to the grade. It is highly preferable that the at least two adjustable feet are able to be adjusted independently of each other. The at least two adjustable feet are preferably able to be adjusted between a left side to right side direction as well as adjusted in a front-to-back direction so as to allow the two adjustable feet to conform to the grade. Some preferred embodiments also include at least one adjustable leg member on a proximal end of the extension portion.

Preferably, the adjustable leg members each include one or more adjustment structures. The adjustment structures include a locking bolt, a first locking nut and a second locking nut.

Highly-preferred embodiments include at least two, opposing adjustable plates between the two adjustable feet and a brace member connected to the adjustable plate. Preferred embodiments include the adjustable plates each having one or more securement structures. The securement structures include both a bolt and at least one nut.

In some preferred embodiments the housing is secured to a wall of a building. It is also preferable that the base and housing are removable and able to be transported to different locations.

Other highly-preferred embodiments include an extension portion connected to the mobile base on a distal end and connected to a building on a proximal end. It is preferable that the extension portion includes a covering.

The term Aimpactable@ as used herein refers to a base or frame which can withstand and transfer an impact load from a vehicle.

DETAILED DESCRIPTION OF PREFERRED EMBODIMENTS

FIGS. 1-10 illustrate a modular loading dock 10 with a mobile base 12 and a housing 32 with a modular frame 34. Frame 34 is self-standing (it can operate as a stand-alone platform and does not need any other structure to function) but frame 34 is versatile as well as modular as it can also be used with any platform, ramp, dock housing or an existing building.

Figure 1:
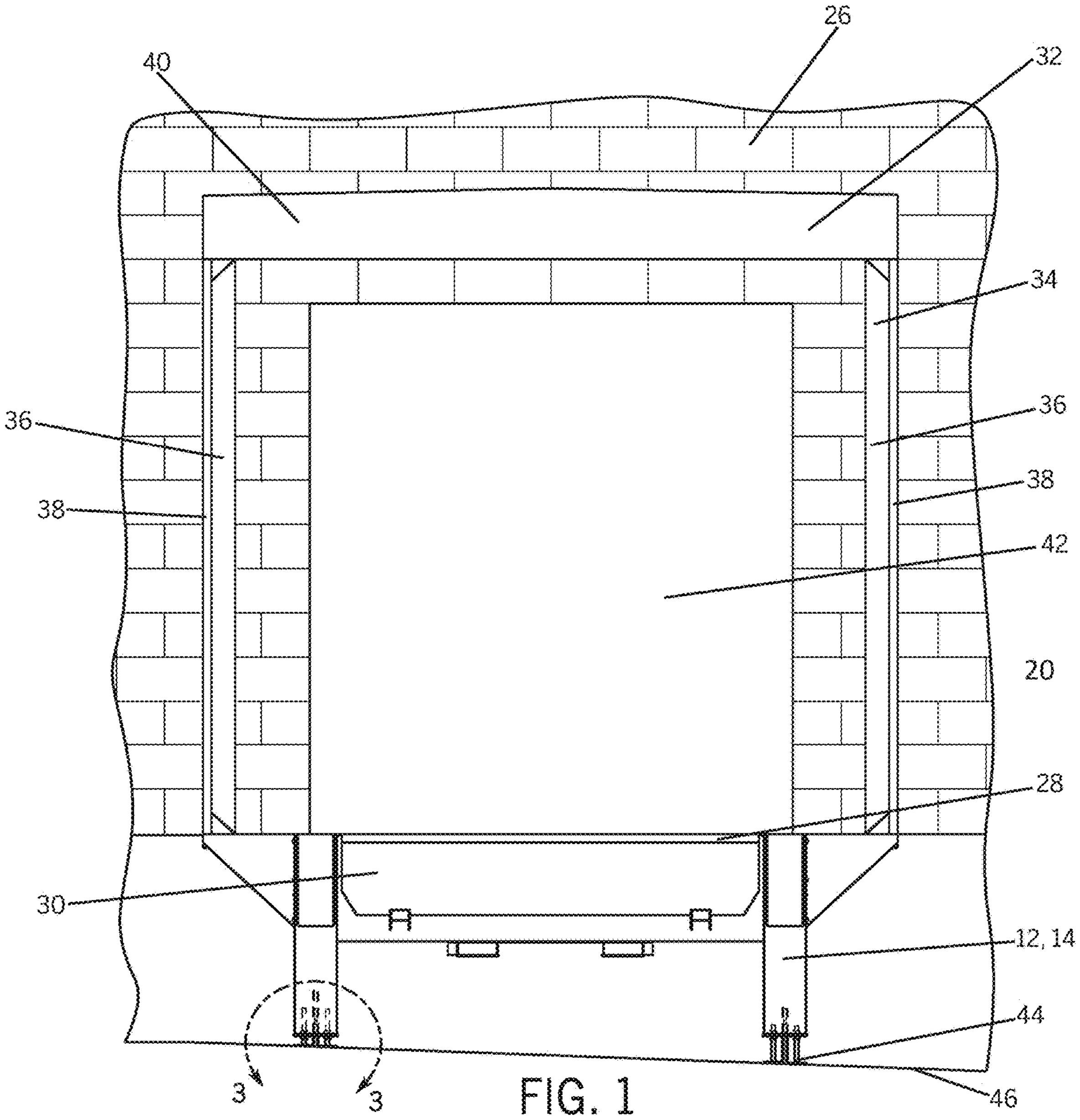
FIG. 1 is a perspective view of a modular loading dock.

FIG. 1 illustrates that base 12 includes at least two but preferably four, opposing, adjustable leg members 14. Base 12 has both top and bottom surfaces 16, 18, with top surface 16 having an opening 20 to receive a dock leveler 58 into opening 20.

Housing 32 includes modular frame 34 which is mounted onto base 12 in sections, as seen in FIG. 1. These sections include a frame-front wall 36, opposed frame-sidewalls 38 and a frame-top wall 40. Frame-front wall 36 has a vehicle-receiving opening 42 to receive a back end of a vehicle as illustrated in FIG. 1.

Figure 2:
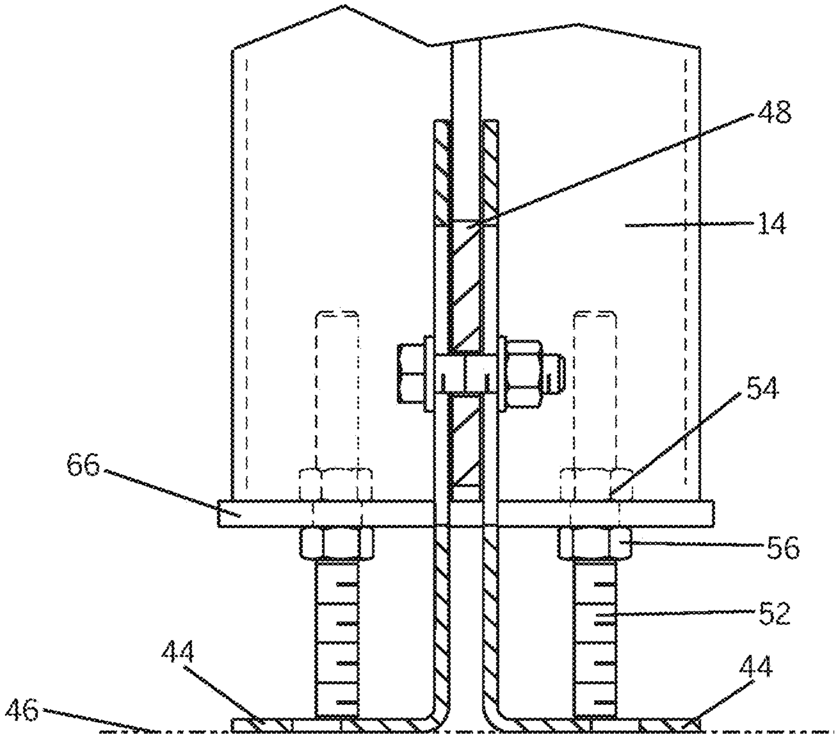
FIG. 2 is a perspective view illustrating an adjustable leg member.
Figure 3:
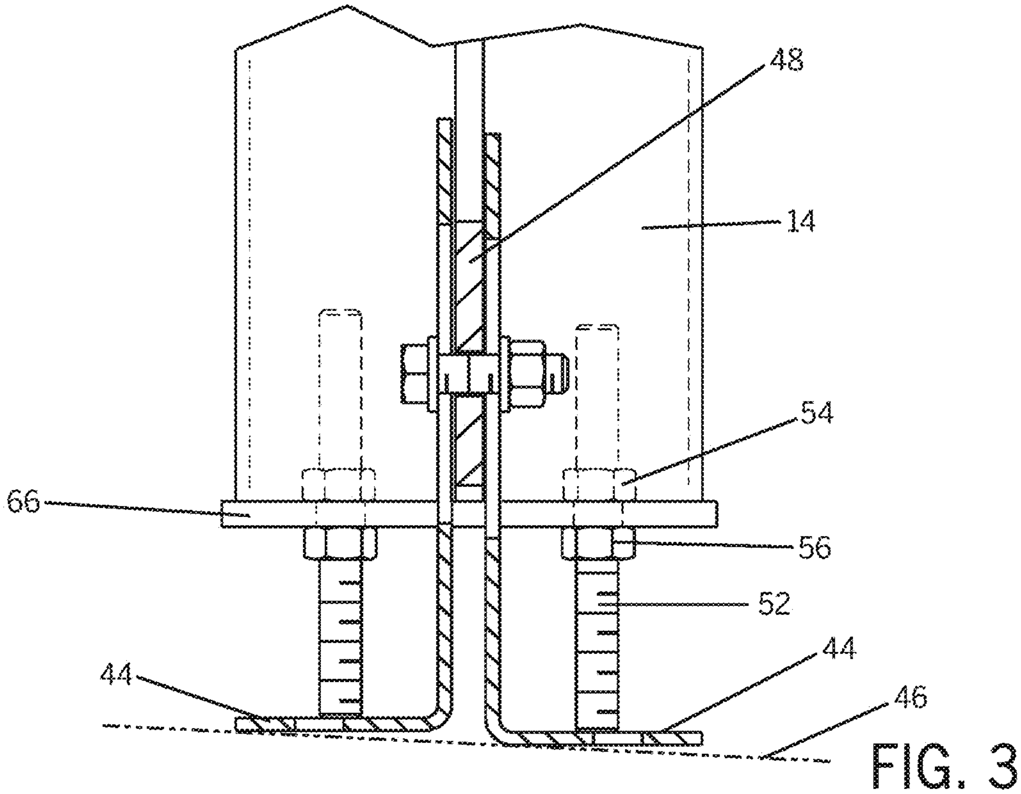
FIG. 3 is a sectional view of an adjustable leg member of FIG. 1 taken along line 3-3.

FIGS. 2-3 illustrate adjustable leg member 14 in detail and that adjustable leg member 14 includes at least two adjustable feet 44 on each adjustable leg member 14. Adjustable feet 44 are able to contact and conform to grade 46. FIG. 2 illustrates adjustable feet 44 contacting the grade 46 which is fairly level. FIG. 3 illustrates how adjustable feet 44 can conform to grade 46 when it is not level. As seen in FIG. 3, adjustable feet 44 are able to be adjusted independently of each other. In FIG. 3, the adjustable feet 44 shown are in different positions so as to securely contact the grade 46. Adjustable feet 44 are able to be adjusted between a left side to right side direction as well as adjustable in a front-to-back direction so as to allow each of the adjustable feet 44 to conform to grade 46.

FIGS. 2-3 illustrate that adjustable leg members 14 include one or more adjustment structures. The adjustment structures include a locking bolt 52, a first locking nut 54 and a second locking nut 56. When first locking nut 54 and second locking nut 56 are loosened, the height of adjustable feet 44 can be changed so as to closely conform to grade 46.

Figure 4:
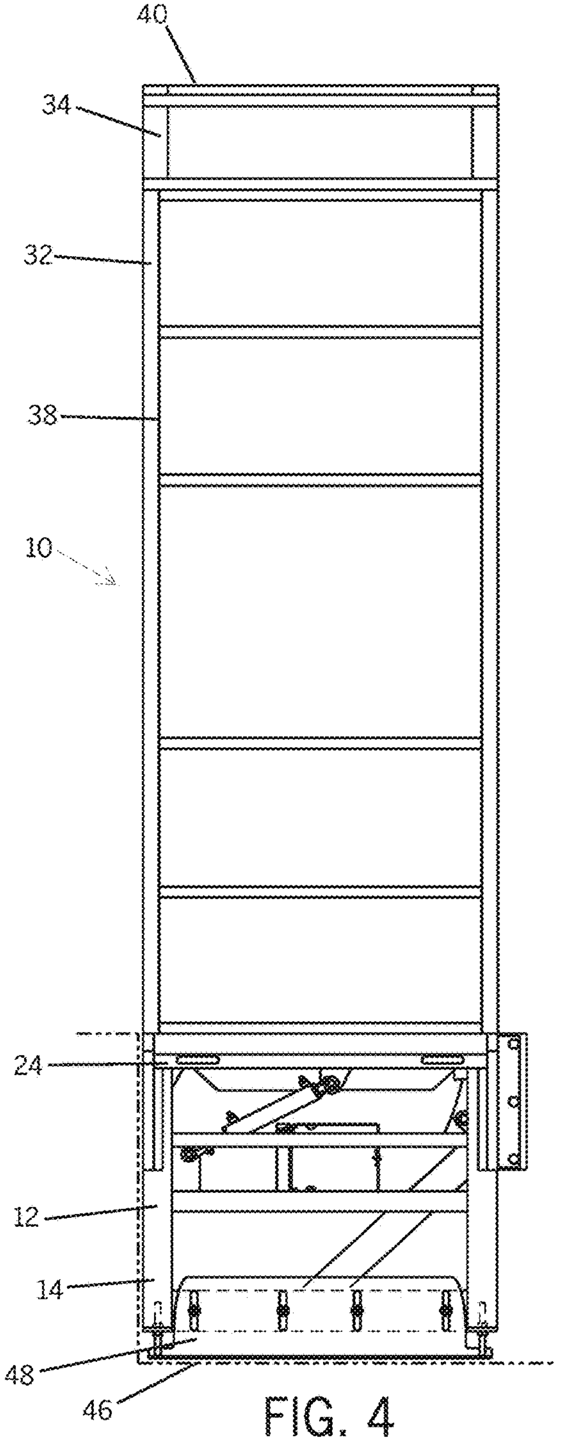
FIG. 4 is a side view of the base and housing.
Figure 5:
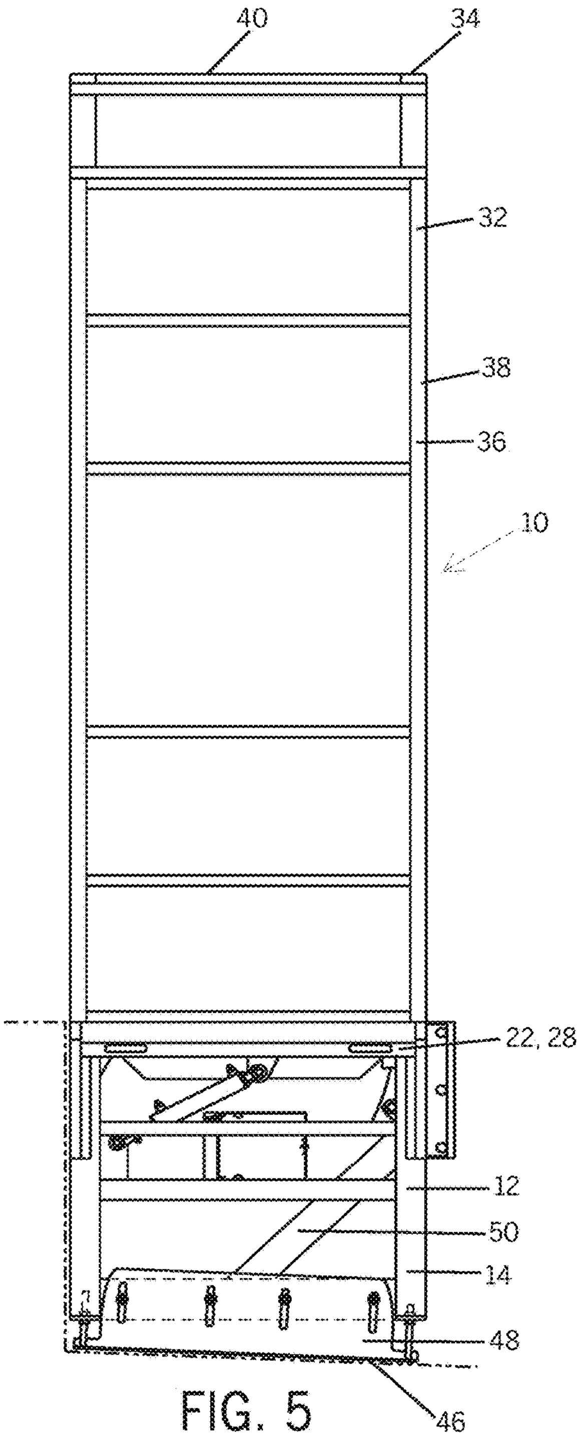
FIG. 5 is a side view of the base and housing with the base adjusted to the grade.
Figure 6:
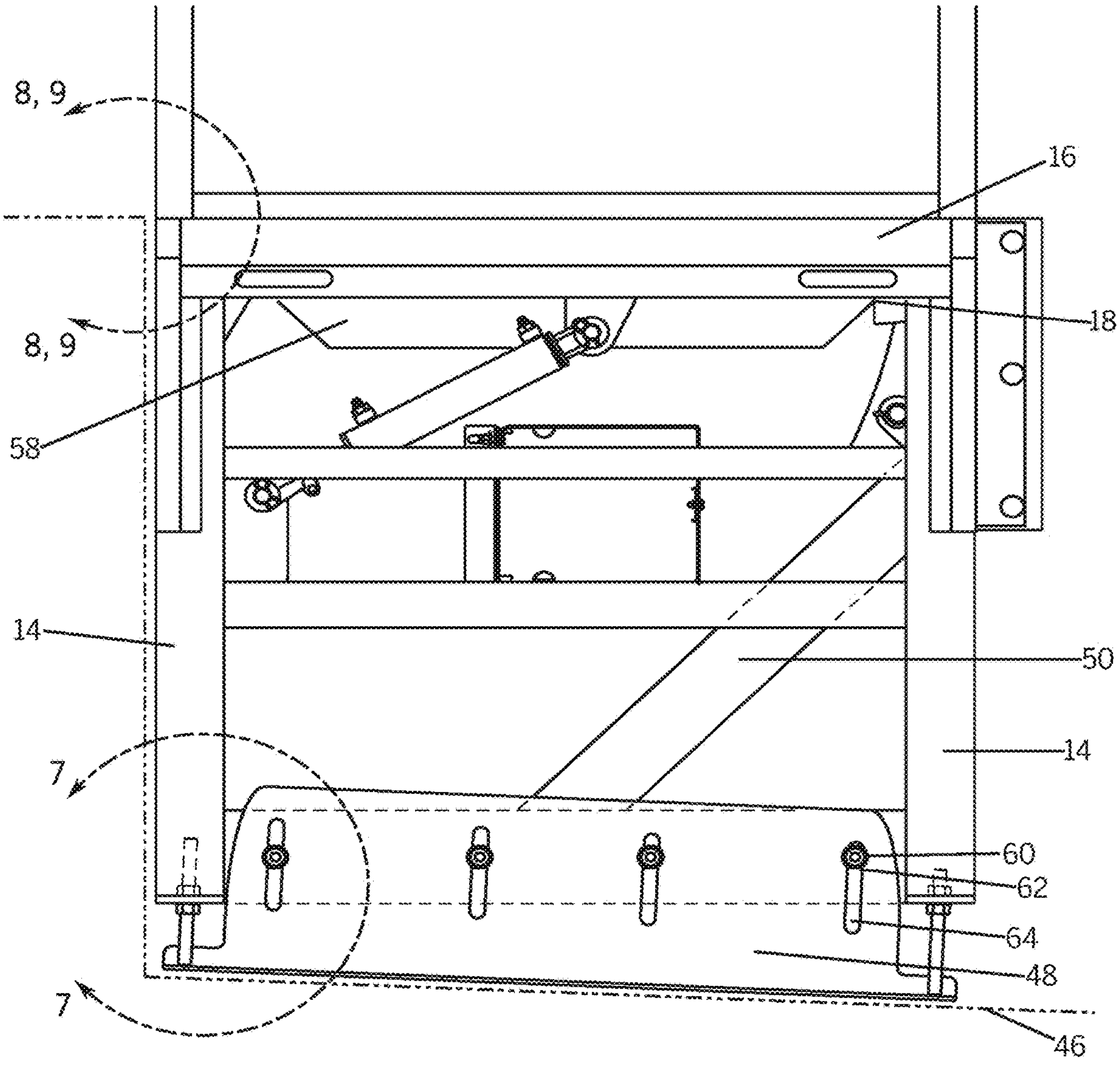
FIG. 6 is a side view of the base.

FIGS. 4-6 illustrate that mobile base 12 has at least two, opposing adjustable plates 48, and each plate 48 is located between two adjustable feet 44. Adjustable plate 48 has a portion of each end which is sandwiched between two adjustable feet which are located on adjustable leg member 14, as seen in FIGS. 2-3. A bolt with two nuts secures adjustable plate 48 in between two adjustable feet 44, as seen in FIGS. 2-3. Each adjustable plate 48 includes one or more securement structures. The securement structures have a bolt 60 and at least one or two nuts 62 to secure bolt 60 in the desired position.

Adjustable leg members 14 can be adjusted to conform to grade 46 by first loosening nuts 62 on each adjustable plate 48. Preferred embodiments of mobile base 12 will include two opposing adjustable plates 48. Nuts 62 must be loosened on each adjustable plate 48. Preferred embodiments include four adjustable leg members on each mobile base 12. Next, first locking nut 54 and second locking nut 56 on each of the four adjustable leg members 14 must be loosened.

Loosening first locking nut 54 and second locking nut 56 allows the height of each of the adjustable feet 44 to be adjusted so that it contacts the grade 46. Each adjustable leg member 14 includes two adjustable feet 44. A mobile base will therefore, have eight adjustable feet 44 in all. Once each of the eight adjustable feet 44 are contacting the grade, first locking nut 54 and second locking nut 56 can be tightened on each adjustable leg member 14. At the same time each nut 62 on adjustable plate 48 can be tightened as well.

FIGS. 4-5 illustrate that adjustable plate 48 also shifts with grade 46. FIG. 4 illustrates adjustable plate 48 in a relatively horizontal position. In contrast, FIG. 5 illustrates that adjustable plate 48 is in an angled position (in a direction angled down to the right of the drawing) showing that adjustable plate 48 has conformed to grade 46 with adjustable feet 44. A brace member 50 is connected to adjustable plate 48 on one end and provides added strength to mobile base 12, as seen in FIGS. 4-6.

FIG. 6 also illustrates in detail how adjustable plate 48, through the use of bolt 60 and nut 62, can be adjusted. As seen best in FIG. 6, adjustable plate 48 includes numerous slots through which bolt 60 and nut 62 can slide in an upward and downward direction as needed to help adjustable plate 48 conform to grade 46. Once adjustable plate 48 is in the desired position, bolt 60 and nut 62 are secured in place in slot 64 by tightening nut 62. Preferably, there are two nuts 62, one on each side of bolt 60.

Figure 7:
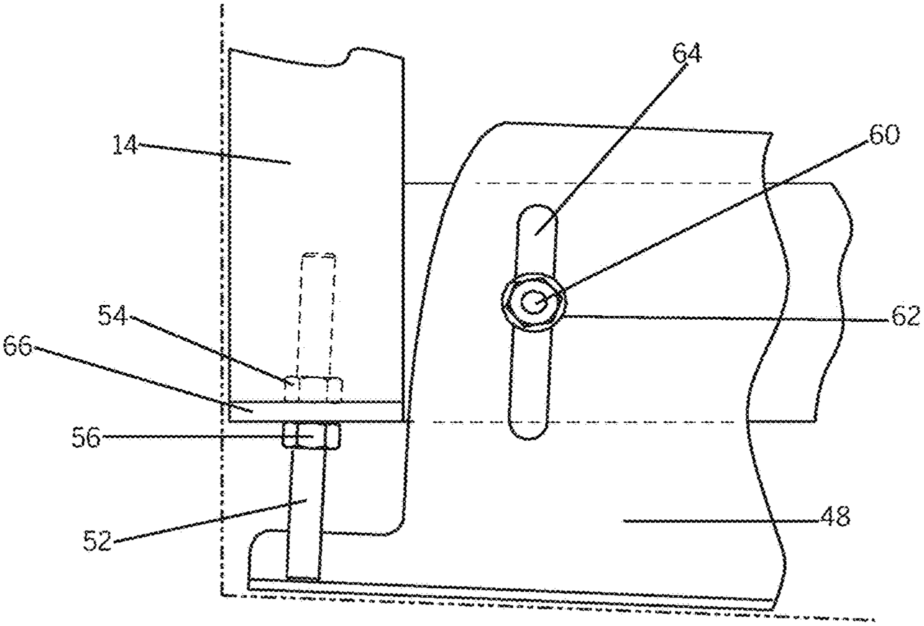
FIG. 7 is a sectional view of an adjustable leg member of FIG. 6 taken along line 7-7.

The adjustment of adjustable leg member 14 and adjustable plate 48 is seen in FIG. 7. FIG. 7 also illustrates in close up detail the interaction and adjustability of leg member 14 and adjustable plate 48. First locking nut 54 and second locking nut 56 are each located on locking bolt 52, as seen in FIG. 7. Locking bolt 52 goes through an opening in a lower end 66 of adjustable leg member 14 (see FIG. 7) so as to secure adjustable leg member 14 in the desired position.

It is important to note that each side of base 12 has an adjustable plate 48 and that each adjustable plate 48 on either side of base 12 can be adjusted independent of the other adjustable plate 48 on the other side of base 12. Being able to adjust adjustable plate 48 to the exact contour of grade 46 allows for a more secure attachment to grade 46 and greater stability of base 12. This is also true of each of the four adjustable leg members 14. Each of the four adjustable leg members 14, which are part of base 12, can be adjusted independent of every other adjustable leg member 14.

Base 12 can be secured to any type of ground 36, including but not limited to gravel, asphalt or concrete. It is important to note that base 12 can be secured to ground 36 by any known method and all such methods are within the scope of the application.

Figure 8:
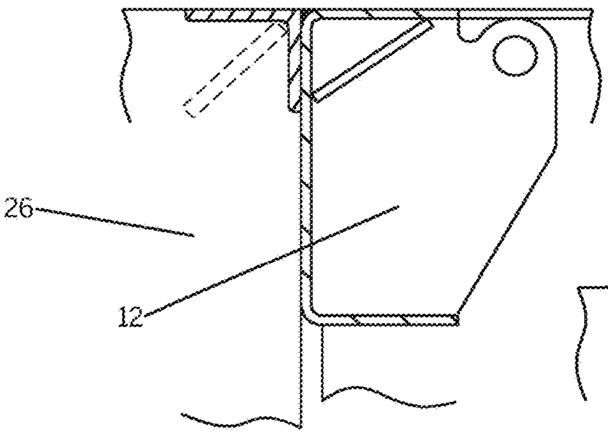
FIG. 8 is a sectional view of the base of FIG. 6 taken along line 8-8.
Figure 9:
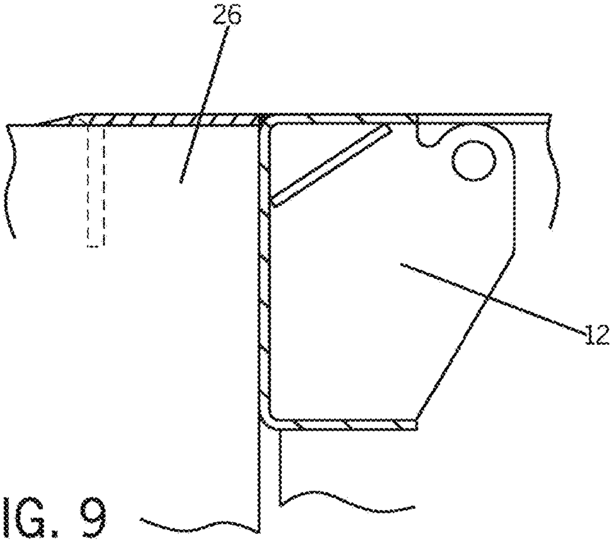
FIG. 9 is a sectional view of the base of FIG. 6 taken along line 9-9.

FIGS. 8-9 illustrate how base 12 can be secured in different ways to a building or other preexisting structure 26.

The drawings also illustrate that dock leveler 58 has a lower end 22 and an upper end 24 (as seen best in FIGS. 4-5). Upper end 24 abuts a preexisting structure 26 and lower end 24 includes a lower edge 28 which has a lip 30, as seen in FIGS. 4-5. Lip 30 is able to be activated between an extended/engaged position to contact a truck bed and a retracted/disengaged position (not shown).

Figure 10:
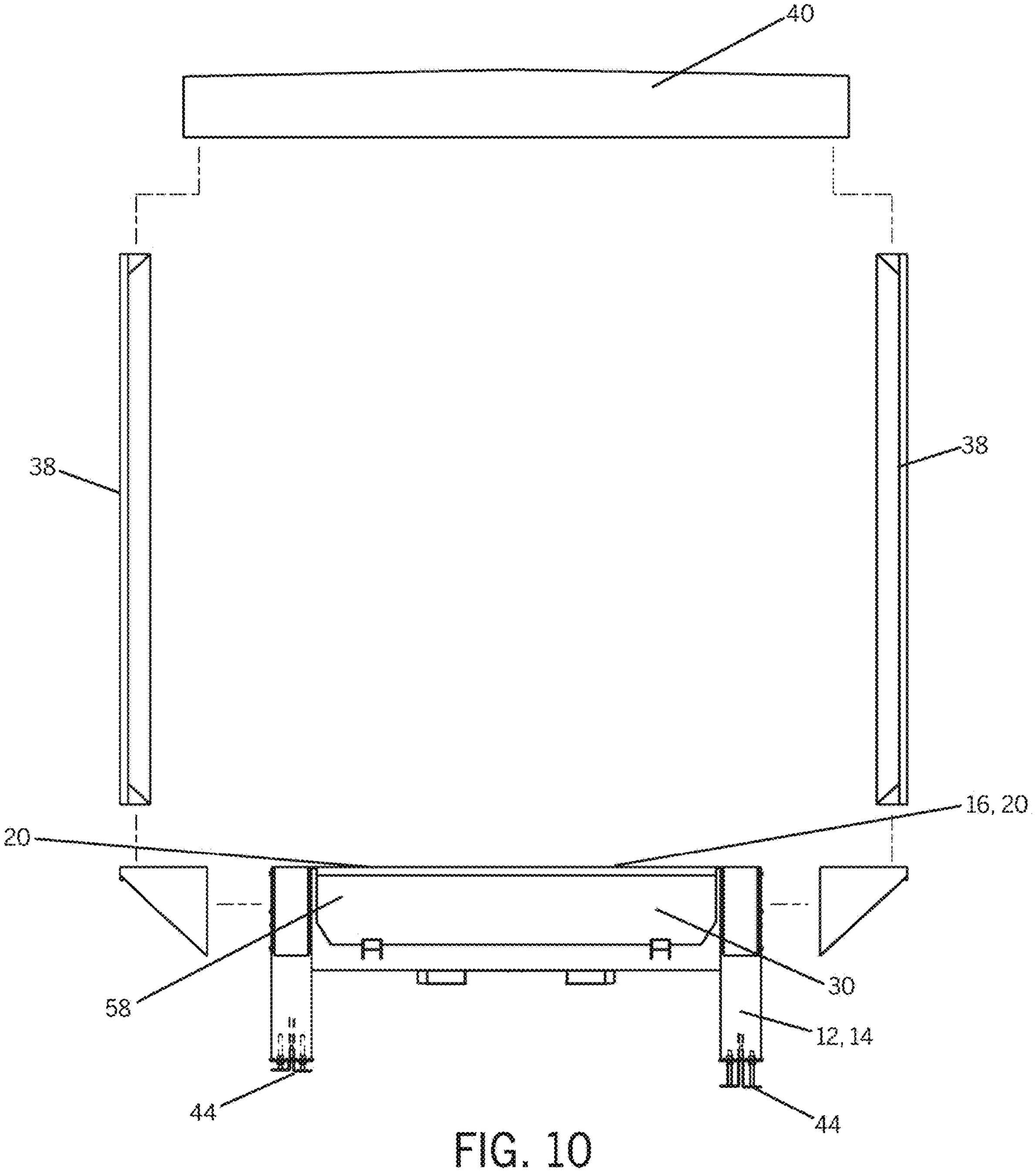
FIG. 10 is an exploded view of the modular loading dock.

FIG. 10 is an exploded view which illustrates the interaction between housing 32, including frame 34 and mobile base 12. Dock leveler 58 with lip 30 can also be seen in FIG. 10. Frame-top wall 40 as well as opposed frame-sidewalls 38 are also seen in FIG. 10. Housing 32 can be secured to a wall of a pre-existing structure 26. (See FIG. 1.) Base 12 and housing 32 are removable and able to be transported to different locations.

Figure 11:
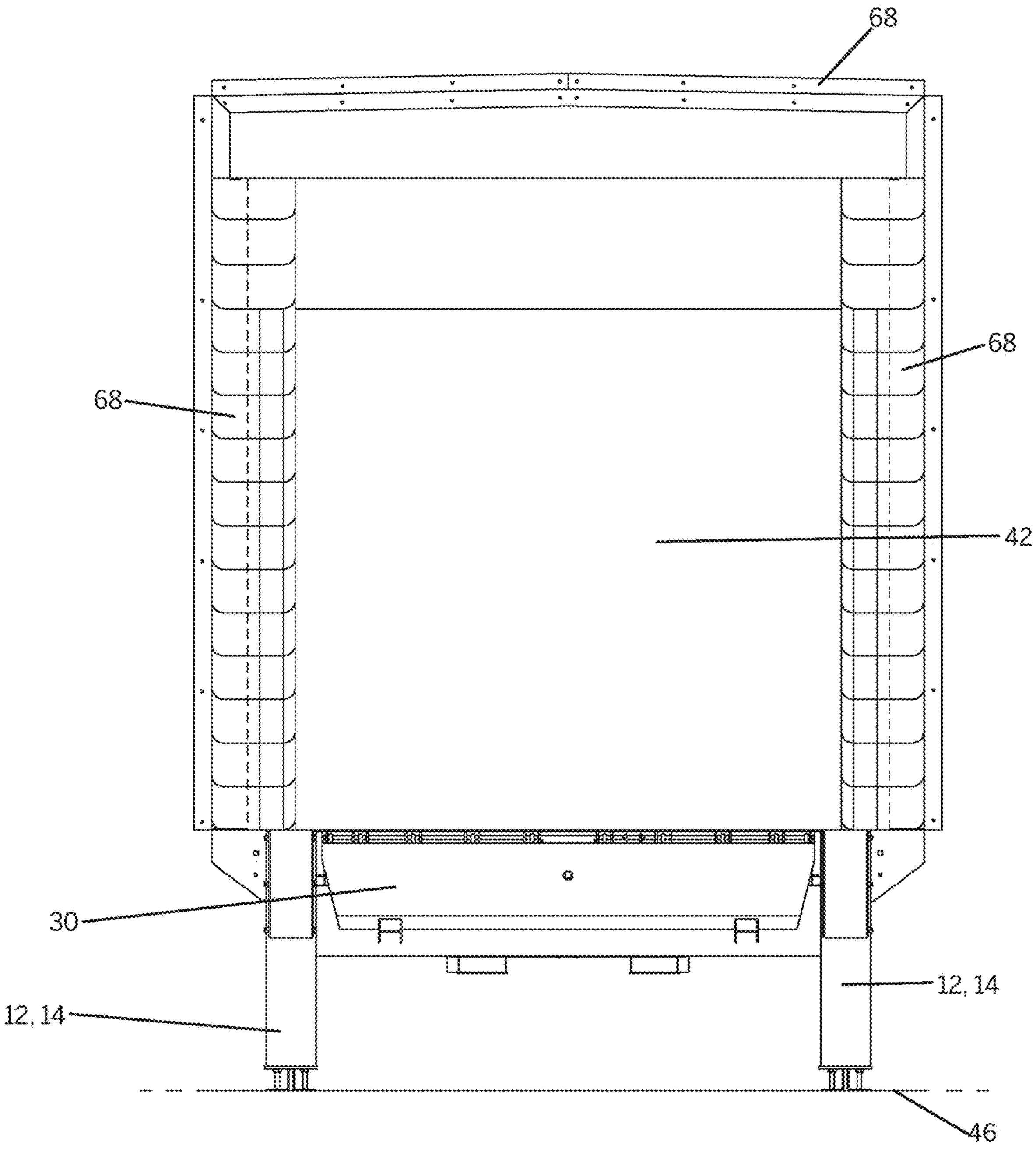
FIG. 11 is a front view of the modular loading dock of FIG. 1 showing the covering.
Figure 12:
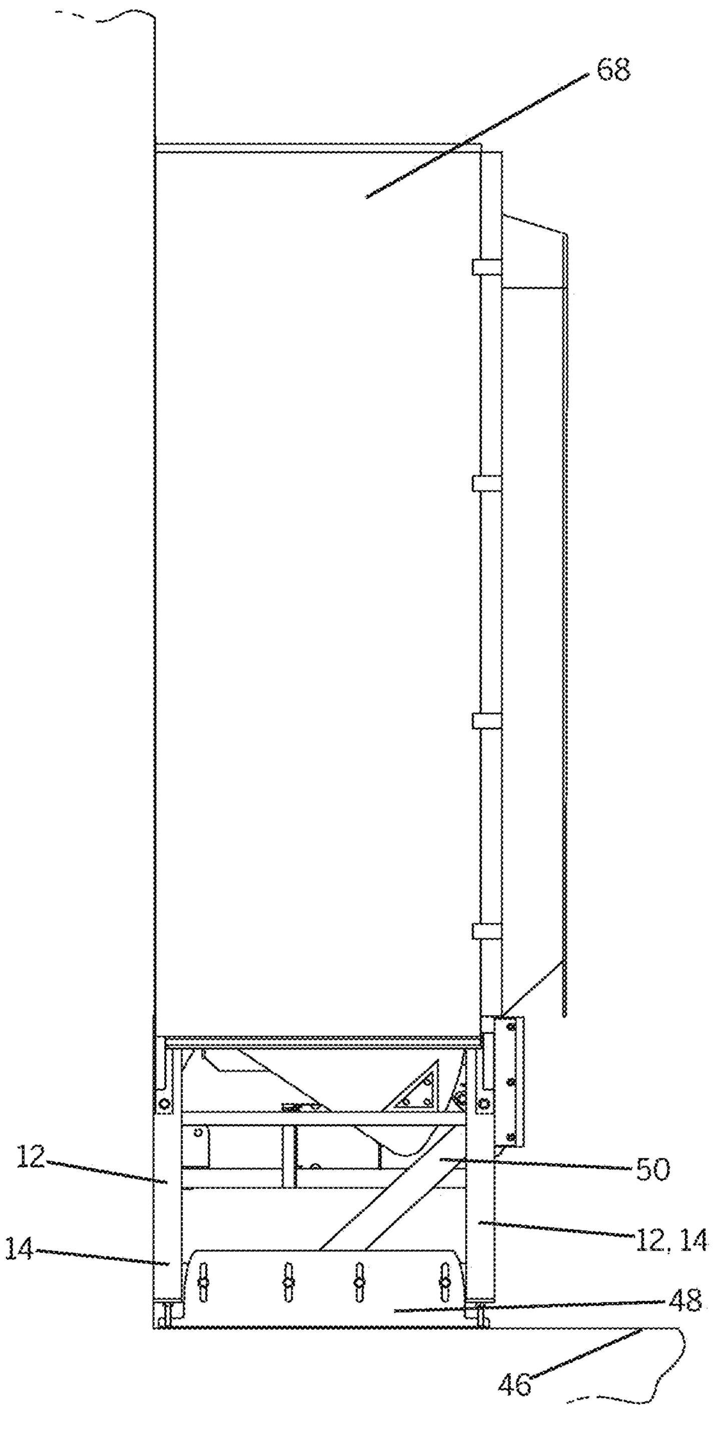
FIG. 12 is a side view of the modular loading dock of FIG. 1 showing the covering.
Figure 13:
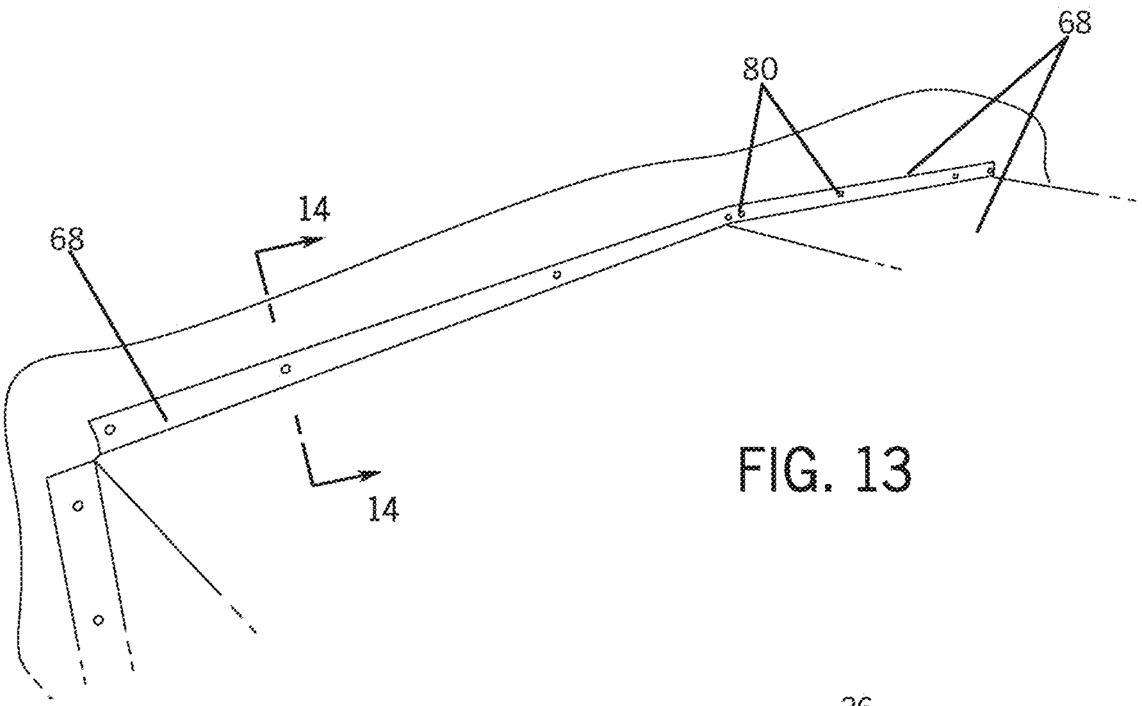
FIG. 13 is a perspective view illustrating the covering.
Figure 14:
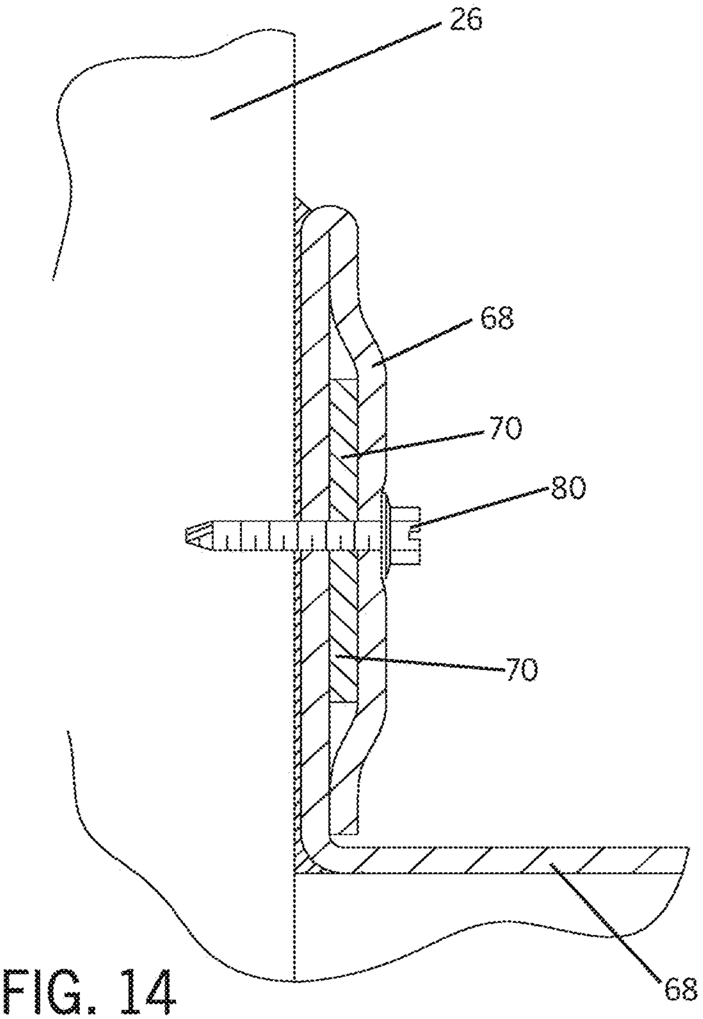
FIG. 14 is a sectional view of the covering of FIG. 13 taken along line 14-14.

A lifting system is incorporated into dock leveler 58. The hydraulic lifts assist in lifting a section of dock leveler 58. However, any other lifting systems known in the art could be utilized as well. A variety of dock levelers of different sizes and shapes can be used and are within the scope of this application FIG. 11 illustrates that mobile base 12 can include a tensioned-vinyl covering 68 over housing 32 and frame 34. Integral flashing 70 is also used in conjunction with covering 68. FIG. 12 is a side view of mobile base 12 with covering 68 over housing 32 and frame 34. FIGS. 13-14 show integral flashing 70 and how covering 68 is fastened to a building or other preexisting structure 26. Covering 68 is inserted into a hem and is then folded over a flashing bar 70, as seen in FIG. 14, and then fastened with a screw 80 or any other type of suitable securement.

Figure 15:
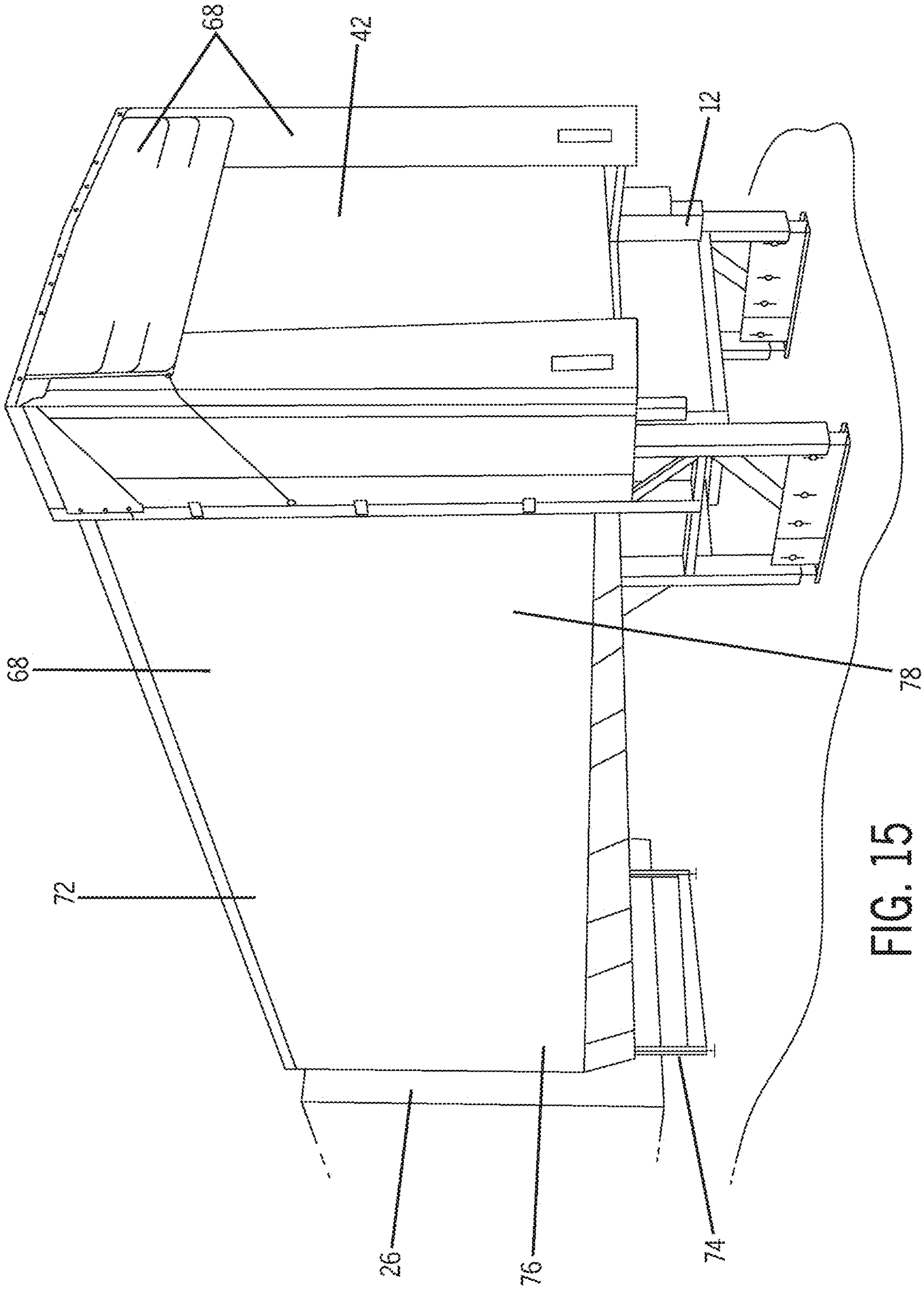
FIG. 15 is a perspective view showing the extension portion with covering.

An extension portion 72, as seen in FIG. 15, is connected to mobile base 12 on a distal end 78 and connected to a building 26 on a proximal end 76. The extension portion 72 includes covering 68. FIG. 15 shows the at least one adjustable leg member 74 on a proximal end 76 of the extension portion 72. Extension portion 72 and covering 68 can be made of any length or width to suit a particular installation and is not limited to the size shown in FIG. 15.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A modular loading dock comprising:
- a dock leveler,
- a mobile base including (a) two, opposing, adjustable leg members; and (b) top and bottom surfaces, the top surface having an opening to receive the dock leveler into the opening, the dock leveler including a lower end and an upper end, the upper end abutting a preexisting structure and the lower end including a lower edge having a lip, the lip being able to be activated between an extended/engaged position to contact a truck bed and a retracted/disengaged position; and
- a housing consisting of a modular frame mounted onto the base in sections, the sections including a frame-front wall, opposed frame-sidewalls and a frame-top wall, the frame-front wall having a vehicle-receiving opening to receive a back end of a vehicle, the modular frame including a covering.

2. The modular loading dock of claim 1 wherein the covering is a tensioned vinyl covering.

3. The modular loading dock of claim 2 further including flashing being integral to the tensioned vinyl covering.

4. The modular loading dock of claim 1 wherein each adjustable leg member includes at least two adjustable feet which contact and conform to the grade.

5. The modular loading dock of claim 4 wherein the at least two adjustable feet are able to be adjusted independently of each other.

6. The modular loading dock of claim 4 wherein the at least two adjustable feet are able to be adjusted between a left side to right side direction as well as adjustable in a front-to-back direction so as to allow the two adjustable feet to conform to the grade.

7. The modular loading dock of claim 1 wherein the adjustable leg members include one or more adjustment structures, the adjustment structures having a locking bolt, a first locking nut and a second locking nut.

8. The modular loading dock of claim 4 further including at least two, opposing adjustable plates between the two adjustable feet.

9. The modular loading dock of claim 8 further including a brace member connected to the adjustable plate.

10. The modular loading dock of claim 9 wherein each adjustable plate includes one or more securement structures, the securement structures having a bolt and at least one nut.

11. The modular loading dock of claim 1 wherein the housing is secured to a wall of a building.

12. The modular loading dock of claim 1 wherein the base and housing are removable and able to be transported to different locations.

13. A modular loading dock comprising:
- a dock leveler;
- a mobile base including (a) two, opposing, adjustable leg members; and (b) top and bottom surfaces, the top surface having an opening to receive the dock leveler into the opening, the dock leveler including a lower end and an upper end, the upper end abutting a preexisting structure and the lower end including a lower edge having a lip, the lip being able to be activated between an extended/engaged position to contact a truck bed and a retracted/disengaged position; and
- an extension portion connected to the mobile base on a distal end and connected to a building on a proximal end;
- X a housing consisting of a modular frame mounted onto the base in sections, the sections including a frame-front wall, opposed frame-sidewalls and a frame-top wall, the frame-front wall having a vehicle-receiving opening to receive a back end of a vehicle, the modular frame including a covering.

14. The modular loading dock of claim 13 wherein the extension portion includes a covering.

15. The modular loading dock of claim 13 further including at least one adjustable leg member on the proximal end of the extension portion.

* * * * *